United States Patent [19]
Giles et al.

[11] Patent Number: 5,745,275
[45] Date of Patent: Apr. 28, 1998

[54] MULTI-CHANNEL STABILIZATION OF A MULTI-CHANNEL TRANSMITTER THROUGH CORRELATION FEEDBACK

[75] Inventors: Clinton Randy Giles, Morganville; Martin Zirngibl, Middletown, both of N.J.

[73] Assignee: Lucent Technologies Inc., Murray Hill, N.J.

[21] Appl. No.: 729,934

[22] Filed: Oct. 15, 1996

[51] Int. Cl.[6] .................................................. H04B 10/04
[52] U.S. Cl. ............................ 359/187; 359/124; 359/161; 372/29; 371/20.5
[58] Field of Search ....................... 359/124, 132, 359/187, 161; 372/29; 371/20.5; 455/67.1, 68

[56] References Cited

U.S. PATENT DOCUMENTS 5,387,992  2/1995  Miyazaki et al. ...................... 359/124

Primary Examiner—Kinfe-Michael Negash

[57] ABSTRACT

A correlation feedback method and apparatus for multi-channel stabilization of a multi-channel transmitter in which a single external receiver is used to detect the total power output from the multi-channel transmitter and to control each channel by correlating the total power output signal with channel data to measure the channels' signal power and control the output power via a feedback loop. The inventive system is suitable for use with and able to accommodate both integrated lasers and an array of discrete independent lasers; the system is also equally applicable for use with channels comprising random independent data or broadcast data.

21 Claims, 7 Drawing Sheets

1 Chnl Mixer O/P FIG. 4a

MULTI-CHANNEL STABILIZATION OF A MULTI-CHANNEL TRANSMITTER THROUGH CORRELATION FEEDBACK

BACKGROUND OF THE INVENTION

1. Field of the Invention

The present invention relates to a system for monitoring and controlling the output power of each channel of a multi-channel transmitter, in particular for an integrated distributive feedback laser array or a multi-frequency laser.

2. Description of Related Art

In a multi-channel transmission system, the output power of each channel varies with changes in temperature and/or aging of the device. Small changes in temperature, for example, in an integrated multi-frequency laser can cause variations in channel power output of several factors of ten. It is due to these fluctuations that multi-channel transmission systems require some means for monitoring and controlling the output power in each transmitted channel. Typically monitoring and controlling of the output power is performed locally using some type of built-in means at the transmitter on each individual channel. For example, in a wavelength division multiplex (WDM) lightwave system each transmitter has its own photodetector positioned behind it for monitoring the backface light emitted from a single semiconductor laser and a feedback loop for controlling the output power.

In contrast, an integrated multi-channel transmitter may not have a built-in means of monitoring each channel independently. Thus, integrated multi-channel transmitters require some type of external detection device. For example, with an integrated distributed feedback laser (DFB) array or a multi-frequency laser (MFL) as, for example, described in the publication by M. Zirngibl, C. H. Joyner and L. W. Stulz, "Demonstration of a 9×200 Mbit/s Wavelength Division Multiplexed Transmitter", Electron. Lett., Vol. 30, p. 1484 (1994), which is incorporated herein by reference, the channels may be monitored using an optical spectrometer to separate the WDM channels. Spectrometers, however, are relatively slow in operation and high in cost and, thus, a more efficient means by which to separate the channels is desired.

It is also known to separate the channels of the laser output by passing the output signal through an optical demultiplexer via a fiber coupler and attaching to each output port a photodiode for monitoring the output power of each channel. This arrangement is also expensive to implement.

It is therefore desirable to provide an inexpensive yet efficient system, suitable for use and able to accommodate both integrated multi-channel transmitters and an array of discrete independent transmitters, for estimating the output optical signal power in each channel based on the total output laser power and for stabilizing each channels+ output power.

SUMMARY OF THE INVENTION

The present invention relates to a correlation feedback method and apparatus for multi-channel stabilization of a multi-channel transmitter in which a single external receiver is used to detect total power output of the multi-channel transmitter which, in turn, is correlated with channel data to measure each channels' signal power and control the output power via a feedback loop. The system in accordance with the invention is suitable for use with and able to accommodate both integrated lasers and an array of discrete independent lasers. Moreover, the system is equally applicable for use with channel data comprising random independent data or broadcast data.

In accordance with the invention, the correlation feedback stabilization system no longer requires that the bandwidth of the correlator match the bandwidth of the data. Moreover, the correlation feedback control loop compensates for temperature-induced changes in the multi-channel transmitter. The invention also monitors the optical light output from the front end of the transmitter, not the back, which is more desirable for truly monitoring a fraction of the total laser output being transmitted.

The correlation-feedback stabilization method and apparatus of the invention also does not require that the multi-channel transmitter, or any of the individual channels, be shut-down during stabilization.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings:

FIG. 4a is a graph showing (1) continuous wave channel power and modulated output power monitored on an optical spectrum analyzer as a function of channel bias current with single-channel operation of the multi-frequency laser using the experimental set-up of FIG. 2, and (2) mixer output voltage with the relative delay of a LO input signal to the mixer set to obtain maximum correlation using the experimental set-up of FIG. 2;

FIG. 4b is a graph representing mixer output versus channel output power of the data shown in FIG. 4a;

DETAILED DESCRIPTION OF THE PRESENTLY PREFERRED EMBODIMENTS

In accordance with the present invention, stabilization and equalization of each channel of a multi-channel transmitter may be based on adjusting the '0' current ($I_{-0}$) or '1' current ($I_{-1}$) levels, bias current, modulation current, or any combination thereof. Since all such adjustments are generally performed in a similar manner, the process will only be described, by way of illustrative example, with regard to stabilization based on the bias current.

Figure 1A:
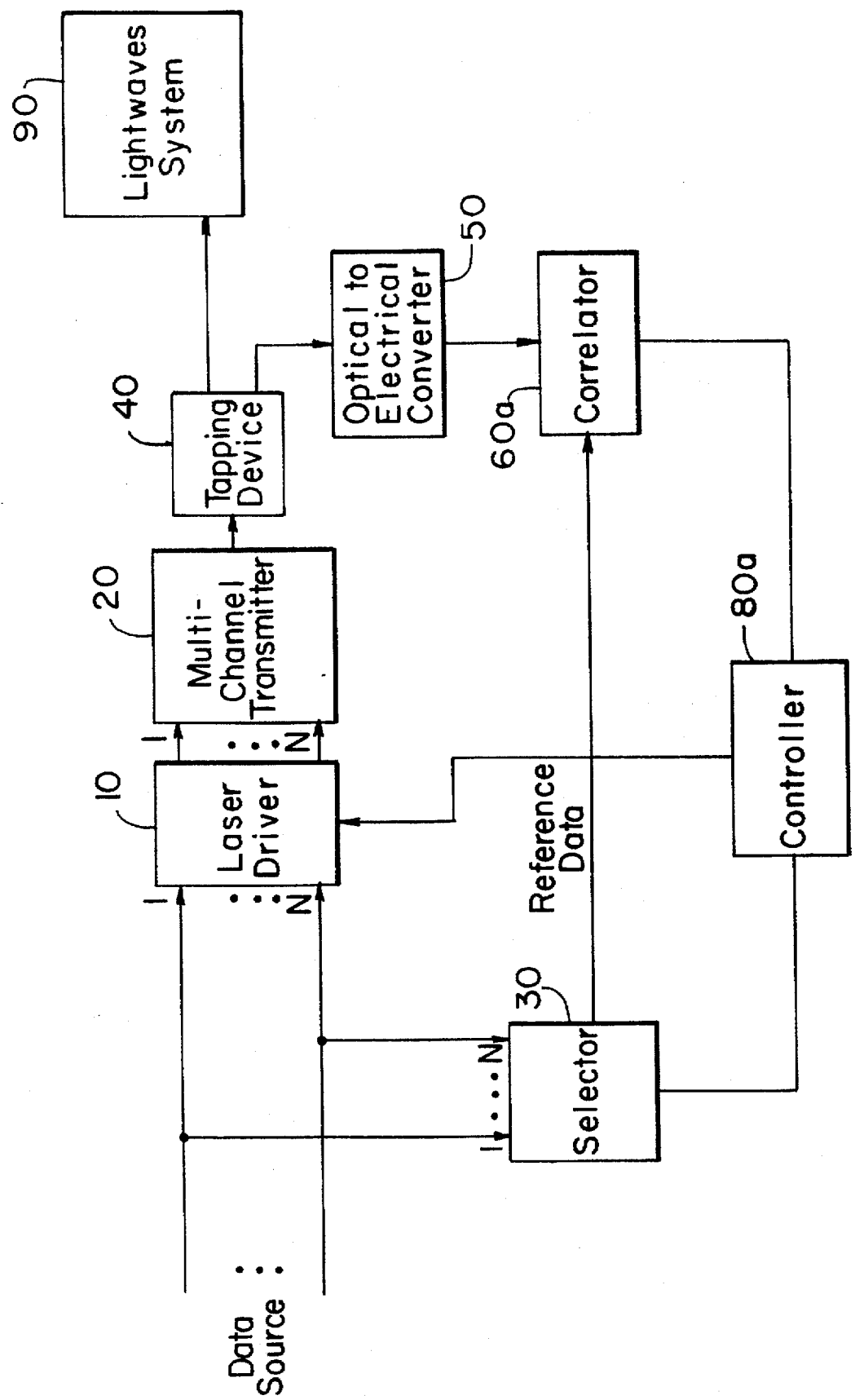
FIG. 1a schematically depicts a correlation feedback multi-channel stabilization system constructed in accordance with a first embodiment of the present invention.

As shown in FIG. 1a, a multi-channel stabilization system constituted in accordance with a first embodiment of the present invention receives a data stream of N channels from a data source. The data stream of N data channels generated from the data source is received by a laser driver 10 which generates N driving signals that control the bias current in each of the N channels. Although adjustment of only the bias current is described, the laser driver 10 is also capable of controlling modulation current and '0' and '1' current levels ($I_{-0}$ and $I_{-1}$). The N driving signals are received by a multi-channel transmitter 20, as for example an integrated DFB laser array or MFL, which generates a total power output signal.

Thereafter, the total power output signal is split by a tapping device 40. Tapping device 40, such as a fiber-splitter (coupler), splits the optical light output from the multi-channel transmitter 20 in some proportional ratio, e.g. 20:80% or any other desired ratio, into two taps or ports. Although two taps or ports are shown in FIG. 1a, it is contemplated that more than two taps or ports may also be used. Moreover, in FIG. 1a, tapping device 40 is shown as separate from the multi-channel transmitter 40; however, tapping device 40 may be integrated with certain multi-channel transmitters. One of the taps or ports of tapping device 40 is connected to a lightwaves system 90 in which the multi-channel transmitter is the optical source. An optical to electrical converter 50, such as an optical receiver or photodetector, receives a sample of the total power output signal through the other tap or port of tapping device 40 and converts the optical signal to an output electrical signal. This output electrical signal is used to measure the output power of each channel.

The N data channels generated by the data source are also received by a selector 30, such as a multiplexer or switching device, which in response to a control signal from a controller 80 sequences through a set of reference data signals associated with each of the N channel data signals and selects a reference data signal associated with a single channel to thereby make that single channel active. A correlator 60a correlates the reference data signal output of the selector 30 with the output electrical signal of converter 50 and generates a correlation voltage proportional to the output power of the active channel. Correlator 60a may be, for example, a single RF mixer or high-speed analog multiplier. Although not shown in FIG. 1a, an analog-to-digital converter or voltmeter may be used to convert the output from the correlator from an analog signal to a digital signal when using an analog device as the correlator, e.g. an RF mixer, in conjunction with a digital controller. Alternatively, the need for an analog-to-digital converter may be eliminated by using an analog device as the correlator and an analog controller.

Controller 80a compares the correlation voltage to a predetermined set-point correlation voltage. If the correlation voltage is not equal to or does not surpass the set-point correlation voltage, then the bias current is adjusted (incremented/decremented) appropriately via a correction signal from the controller 80 to the laser driver 10 and the process is repeated. Otherwise—if the correlation voltage is either equal to or surpasses the set-point correlation voltage—then the channel has reached a nominal operating point and the process stops. If the bias current is adjusted and the correlation voltage surpasses the set-point correlation voltage, then after all of the channels have been sequenced to thereby return to the same channel, the bias current will start at the level prior to surpassing the set-point correlation voltage. For example, if the correlation voltage for channel i is 49 mV and the set-point correlation voltage is 50 mV, then the bias current will be incremented and, if the correlation voltage is then 51 mV, the process stops. After all of the N data channels have been stabilized and channel i is once again selected, the bias current for channel i will start at the previous level before the correlation voltage surpassed the set-point correlation voltage and the process is repeated.

When the correlation voltage of a particular channel surpasses or is equal to the set-point correlation voltage, that active channel is nominally equalized; controller 80a then signals selector 30 to sequence through the set of reference data signals to the next reference data signal associated with the next channel, and the process is repeated. Controller 80a continuously sequences through the set of reference data signals, one at a time, by sending a control signal to selector 30, and the correlation feedback process is repeated for each channel during operation of the multi-channel transmitter so that the output power of each of the channels is equalized. Thus, in accordance with the invention the output power of each channel may be stabilized without having to shut-down the multi-channel transmitter.

Figure 1B:
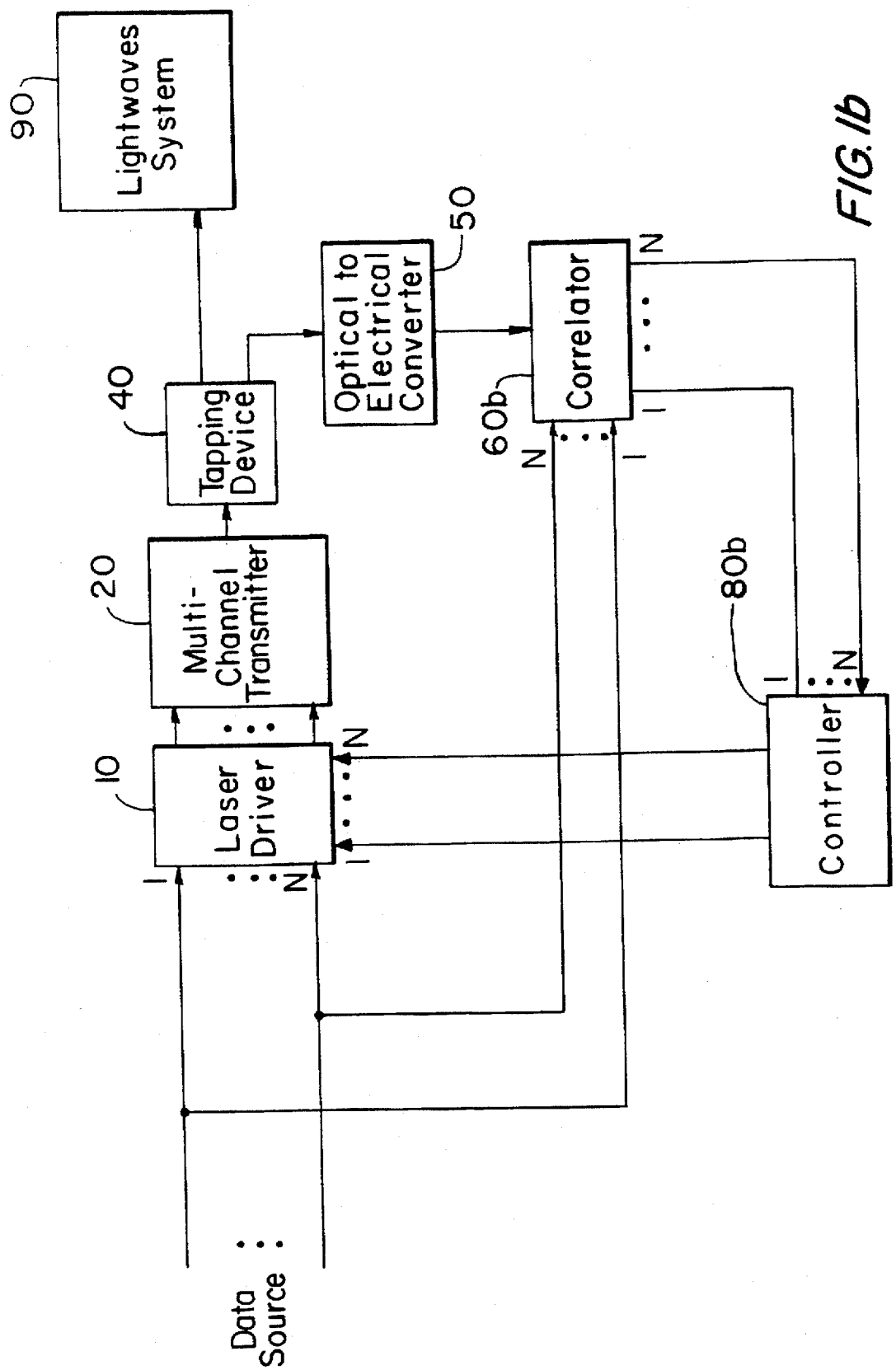
FIG. 1b schematically depicts a correlation feedback multi-channel stabilization system constructed in accordance with a second embodiment of the present invention.

In a second embodiment, shown in FIG. 1b, stabilization of the channels is performed for each of the N data channels in parallel, instead of sequentially as in the first embodiment shown in FIG. 1a. The multi-channel stabilization system of this second embodiment is distinguishable from the first embodiment in that: 1) selector 30 has been eliminated in the second embodiment so that correlator 60b directly receives the N data channels in parallel; 2) correlator 60b comprises, by way of example, a plurality of RF mixers or a plurality of high-speed analog multipliers, one for each of the N data channels, or a single digital signal processing chip, and generates a plurality of correlation voltages, one for each of the N data channels; and 3) controller 80b generates a plurality of correction signals, one for each of the N data channels. Thus, the correlation feedback multi-channel stabilization system in accordance with this second embodiment employs the same correlation feedback technique as the first embodiment, the only difference between the embodiments being that in the first embodiment stabilization of the channels is performed sequentially whereas, in the second embodiment, stabilization of all of the N data channels is performed in parallel.

Successful implementation of multi-channel stabilization in accordance with the invention requires that the channels have weak cross-correlations among their data or that some type of feedback compensation be applied. Therefore, the correlation feedback system in accordance with either the first or second embodiment of the invention may also be used, when necessary, to correct for inherent offset errors, for example, when using an analog mixer as the correlation device. After all of the channels have been nominally equalized, offset errors are measured in one round while sequencing through the channels by disabling (turning off) a single channel at a time and determining the correlation voltage using the reference data signal associated with the disabled channel. Thus, the controller sends a signal to laser driver 10 to disable a single channel and the correlation voltage is determined. Based on the correlation voltage, which represents a measured offset error, the controller generates an offset error signal which is used to compensate for offset errors, via the feedback loop to laser driver 10. Then the next reference data signal is selected, the associated channel is disabled and the offset error process is repeated until the offset error has been corrected for each channel. This offset error correction process is performed once for each channel. In an alternative embodiment or modification, longer correlation times may be used to reduce cross-correlation errors, or cross correlation errors may be reduced by using binary correlators as for example a Harris Semiconductor HSP45256 Binary Correlator, in order to synthesize real-time corrections to the correlation voltage.

In operation, a nominal bias current and set-point correlation voltage is set depending on the design objective. Stabilization processing is performed on each channel independently by selecting the reference data signal for which stabilization processing is to begin. The data stream of N data channels generated by the data source is transmitted to the laser driver and the selector 30. Laser driver 10 generates N driving signals, one for each of the N data channels, which are received by the multi-channel transmitter 20 and a total power output signal is generated. A sample of the total power output signal from the multi-channel transmitter 20 is converted from an optical to an electrical signal. The output electrical signal from converter 50 and the reference data signal from the selector 30 are correlated and the correlation signal generated is converted to a correlation voltage. Controller 80 compares the correlation voltage with the set-point correlation voltage. If the correlation voltage does not equal or surpass the set-point correlation voltage, then the bias current is adjusted via a correction signal from the controller to the laser driver and the correlation voltage is determined. This process is repeated until a nominal operating point is reached, when the correlation voltage surpasses or is equal to the set-point correlation voltage. Once the nominal operating point of a channel has been reached, the controller sends a control signal to the selector 30 to sequence through to the next reference data signal so that the next channel becomes the active channel. This iterative process is continuously performed during operation of the multi-channel transmitter in order to stabilize each channel's output power. A similar operation is performed using the disclosed second embodiment of the invention the only difference being that the N data channels are not processed sequentially but are instead stabilized in parallel.

After all of the channels have been nominally equalized, in one instance while sequencing through the channels, offset errors may be measured by disabling (turning off) the presently active channel and determining the correlation voltage. If the correlation voltage is zero, then no offset error is detected. Otherwise, the correlation voltage represents the measured offset error of the channel. The laser driving signal of the channel is adjusted on the basis of the measured offset error, via a feedback loop from the controller. This offset correction process is performed a single time for each channel in order to correct for inherent offset when using an analog mixing device as the correlator.

The correlation feedback stabilization method and apparatus of the invention is particularly versatile in that both independent random data and broadcast data may be used as the channel data. In the instance in which broadcast data is used, the data must be decorrelated to ensure that the channels will be properly distinguished. Decorrelation of the data may be accomplished by introducing relative time delays, as for example using shift registers, between the channels. Alternatively, or in addition thereto, longer correlation times may be used to differentiate the channels. Thus, the invention can be used with broadcast data so long as the channel data is sufficiently decorrelated, irrespective of the means by which the data is decorrelated.

In addition, the reference data signals may be simply the channel data signals themselves, or a unique identification code carried as part of each data channel, as for example a header or trailer, may also be used. The unique identification codes associated with each of the N data channels may be represented by a matrix, the rows of which form an orthogonal set of vectors corresponding in number to the number of channels in the multi-channel transmitter such that each row is used to identify each of the channels. For example, the orthogonal set of eight 8-bit vectors for an 8-channel multi-channel transmitter may be represented by the matrix $$A = \begin{vmatrix} 1 & -1 & -1 & -1 & -1 & 1 & 1 & 1 \\ -1 & 1 & -1 & -1 & 1 & -1 & 1 & 1 \\ -1 & -1 & 1 & -1 & 1 & 1 & -1 & 1 \\ -1 & -1 & -1 & 1 & 1 & 1 & 1 & -1 \\ -1 & 1 & 1 & 1 & 1 & -1 & -1 & -1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \end{vmatrix}$$

The array A may be written in bipolar form to clearly show that the inner product of any two rows is zero. Furthermore, the equal density of marks and spaces also ensures that other input noise will average to zero at the output of the correlator. Use of identification codes provides the additional benefit of simplifying the implementation of correlation feedback in regenerators by locally synthesizing the correlation sequences rather than having to recover the data from all of the channels.

In yet another modification, in lieu of the unique identification codes comprising part of the data stream the unique identification codes may be a small modulation depth on top of the data stream. It is also contemplated that each channel may be identified using unique audio tones or any other means by which the individual channels may be distinguished.

Experimental Results

Figure 2:
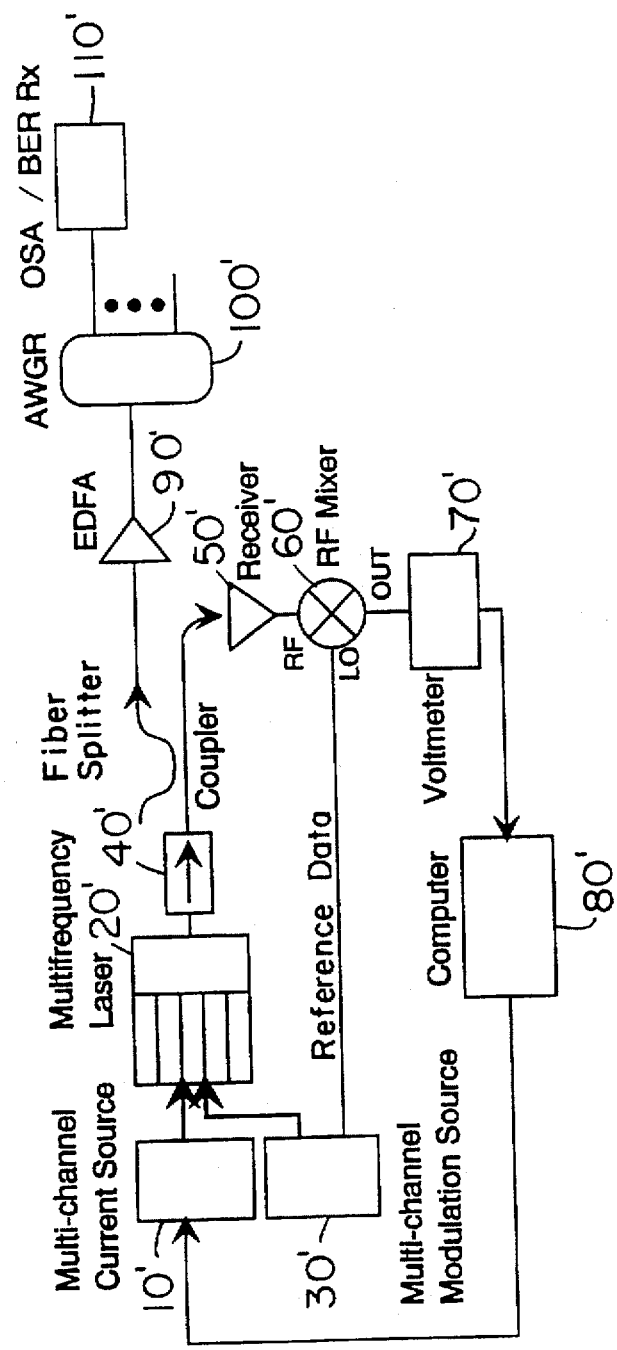
FIG. 2 schematically depicts an experimental set-up of a correlation feedback stabilization system for an integrated 24-channel 1550 nm InGaAsP laser in accordance with the invention.

An experimental apparatus, as shown in FIG. 2, was used to verify the accuracy of stabilization through correlation feedback in accordance with the invention. In particular, an integrated 24-channel 1550 nm InGaAsP laser, as described in the aforementioned publication by M. Zirngibl, C. H. Joyner and L. W. Stulz, "Demonstration of a 9×200 Mbit/s Wavelength Division Multiplexed Transmitter", Electron. Lett., Vol. 30, p. 1484 (1994), was used as the multi-frequency laser 20'. The InGaAsP laser included an arrayed-waveguide router with gain sections on each of the 24 channel ports and a single common amplifier on the output port. The laser was packaged with a thermo-electric cooler and connectorized with a lensed fiber pigtail. Only 8 laser channels were operated with 200 GHz channel spacing (approximately 1548 to 1559.5 nm wavelength range) and each of the 8 gain sections was biased in the nominal range of 50 to 80 mA. The modulation signals, approximately 40 mA peak-to-peak, were AC-coupled through bias tees. Each channel was modulated with 50 Mb/s, 1 Kbit length random strings created from a random number generator using different seed numbers for each channel. Broadcast data was also tested by copying the same data pattern into all channels and shifting successive channels by 1 bit (20 ns) in order to decorrelate the data.

Two modulation formats were tested: simultaneous non-return-to-zero (NRZ) modulation of all channels and sequential return-to-zero (RZ) modulation. With sequential RZ modulation the current pulses to the channels were 1.6 nsec long (8% duty cycle RZ) and staggered in 2.5 nsec steps to prevent pulse overlap among the channels. Sequential RZ modulation is beneficial as it reduces channel crosstalk from electrical coupling and gain saturation, at the expense however of requiring higher modulation bandwidth. The total fiber-coupled output power from the laser was approximately −10 dBm with NRZ modulation (−13 dBm with sequential RZ) and was divided through a 20:80% fiber-splitter 40' with the output from the 80% tap connected to an optical receiver 50' used for the feedback loop.

The output electrical signal of the optical receiver 50' was connected to the RF input of a 10 MHz bandwidth RF electrical mixer 60'. A 10 MHz bandwidth was sufficient here to obtain correlation measurements on 50 Mb/s data. The RF mixer's LO input was connected to one channel of a multi-channel modulation source 30'; the mixer's IF output was connected to a voltmeter 70'. The output of the voltmeter was proportional to the correlation of the laser output power $P_{total}(t)$ and the LO input signal $V_{LOj}(t)$ where j designates the selected channel. The mixer output is given by the equation $$V_{mix} = K \times AVG\ [V_{LOj}(t) \times P_{total}(t)]$$

where K is a scale factor.
If $$P_{total}(t) = P_{cw} + \Sigma\ P_i(t)$$

and $$AVG\ [P_i(t) \times P_j(t)] = 0\ \text{for}\ i \neq j$$

where $P_{cw}$ is the continuous wave output power, which includes amplified spontaneous emission and unmodulated channel power;

$\Sigma P_i(t)$ represents the summation of each channels' output power;

$P_i(t)$, $P_j(t)$ represent the output power of different channels; and i, j designates two separate selected channels.

then, $V_{mix}$ is proportional to the modulated signal power in channel j.

In the experiment using 1 kilobit-length data sequences, the channels were not completely orthogonal and a residual offset voltage was corrected in order to improve the accuracy of correlation feedback.

Figure 3:
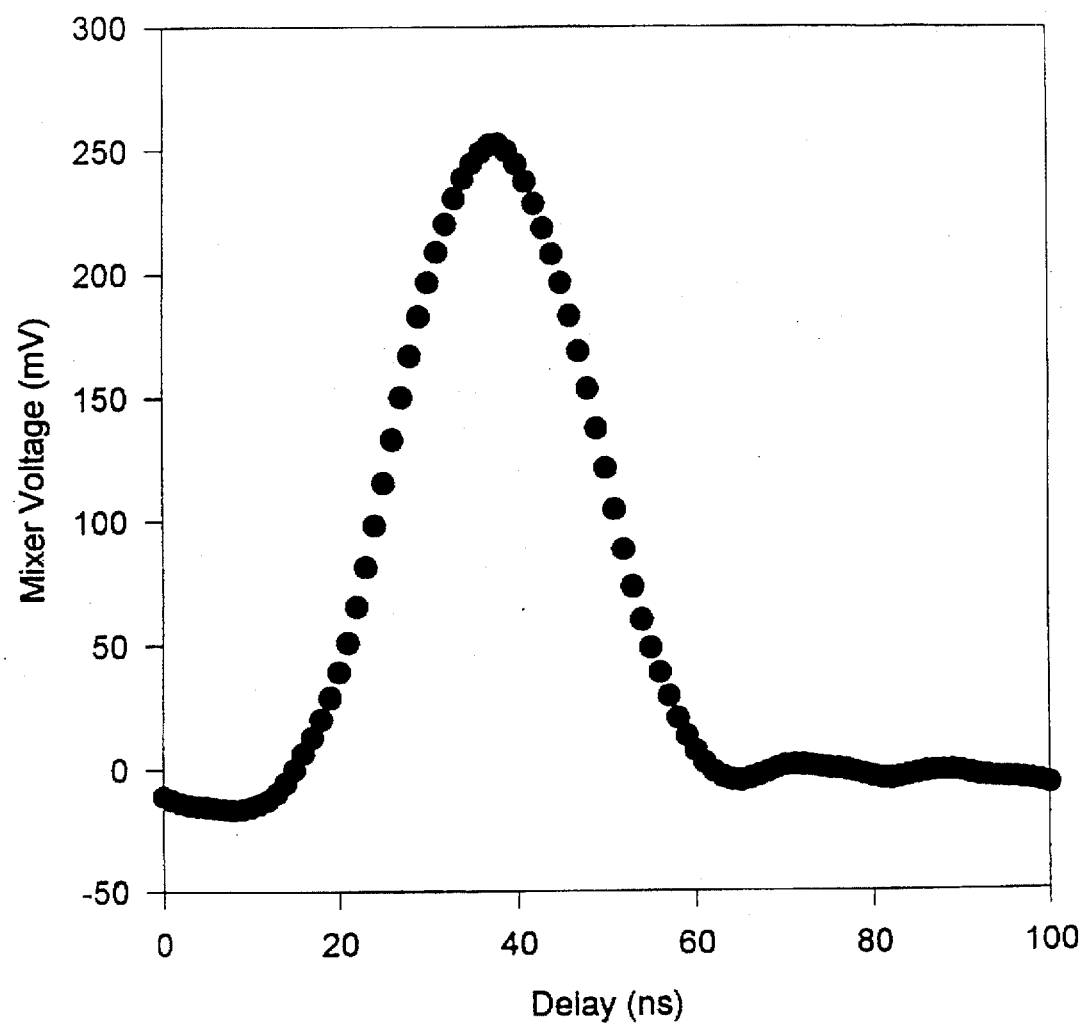
FIG. 3 is a graph representing RF mixer output voltage as a function of relative delay of LO signal input for single-channel operation of the experimental set-up of FIG. 2.

The relative timing of the LO and RF input voltages to the RF mixer were adjusted to obtain the maximum output signal as shown in FIG. 3. This measurement was obtained with the laser operating on a single NRZ channel and mixing the received signal with a delayed replica of the data. The curve shown in FIG. 3 is typical of an autocorrelation function of random data; the response is maximum where the input signals to the mixer are bit synchronized and approaches zero when the delay is advanced or retarded by more than one bit period. FIG. 3 also illustrates the principle of decorrelating the broadcast data.

FIG. 4a shows measured L-I curves of the optical output power in the 20% port of the fiber-splitter versus DC laser bias with the MFL operating in a single channel. The common output amplifier was biased at 150 mA. These measurements were taken with continuous wave and NRZ modulated laser conditions. Also shown is the mixer output when the delay of the Lo signal to the mixer was set to obtain the maximum correlation. The continuous wave lasing threshold was approximately 50 mA; the apparent threshold under modulation was 30 mA as the modulation current of 40 mA peak-to-peak was AC coupled through the bias tee. Above 70 mA DC bias, the modulated L-I curve slope efficiency sharply increased as the '0' level went above threshold. Near this same bias condition the mixer output leveled off and then declined due to laser saturation.

Figure 4B:
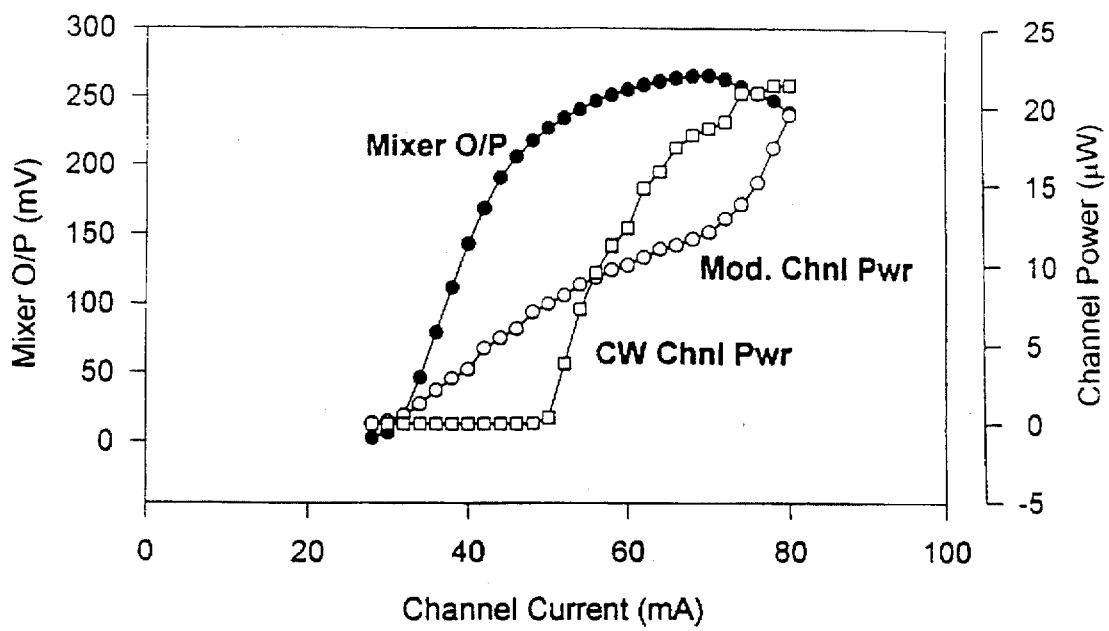
Figure 4B:
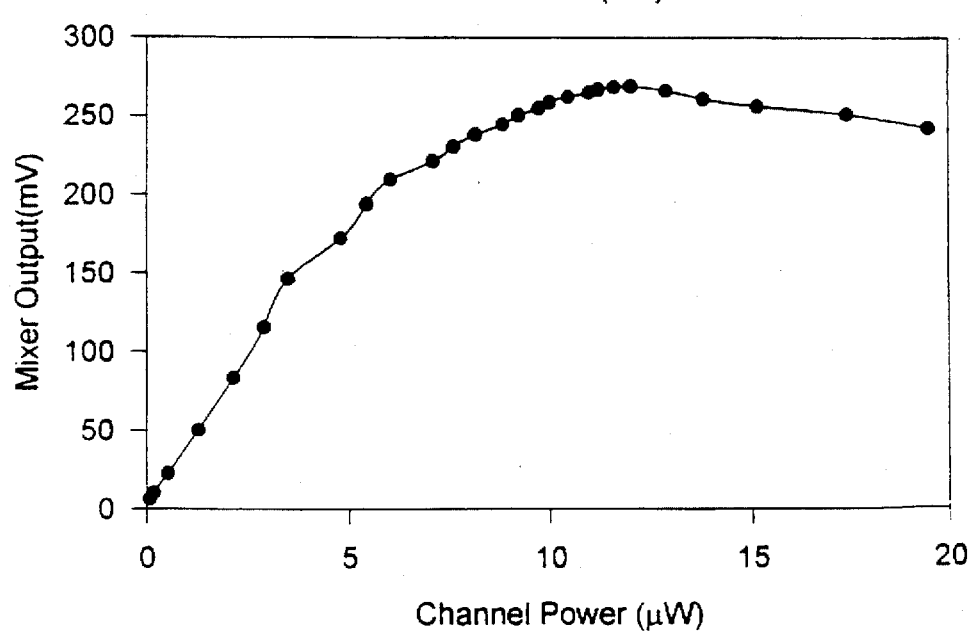

FIG. 4b represents the mixer output versus channel output power and clearly shows the saturation of the mixer output once the '0' level bias reaches the laser threshold. Saturation of the mixer output is a useful signature for identifying the optimum operating currents for the MFL channels.

Figure 5:
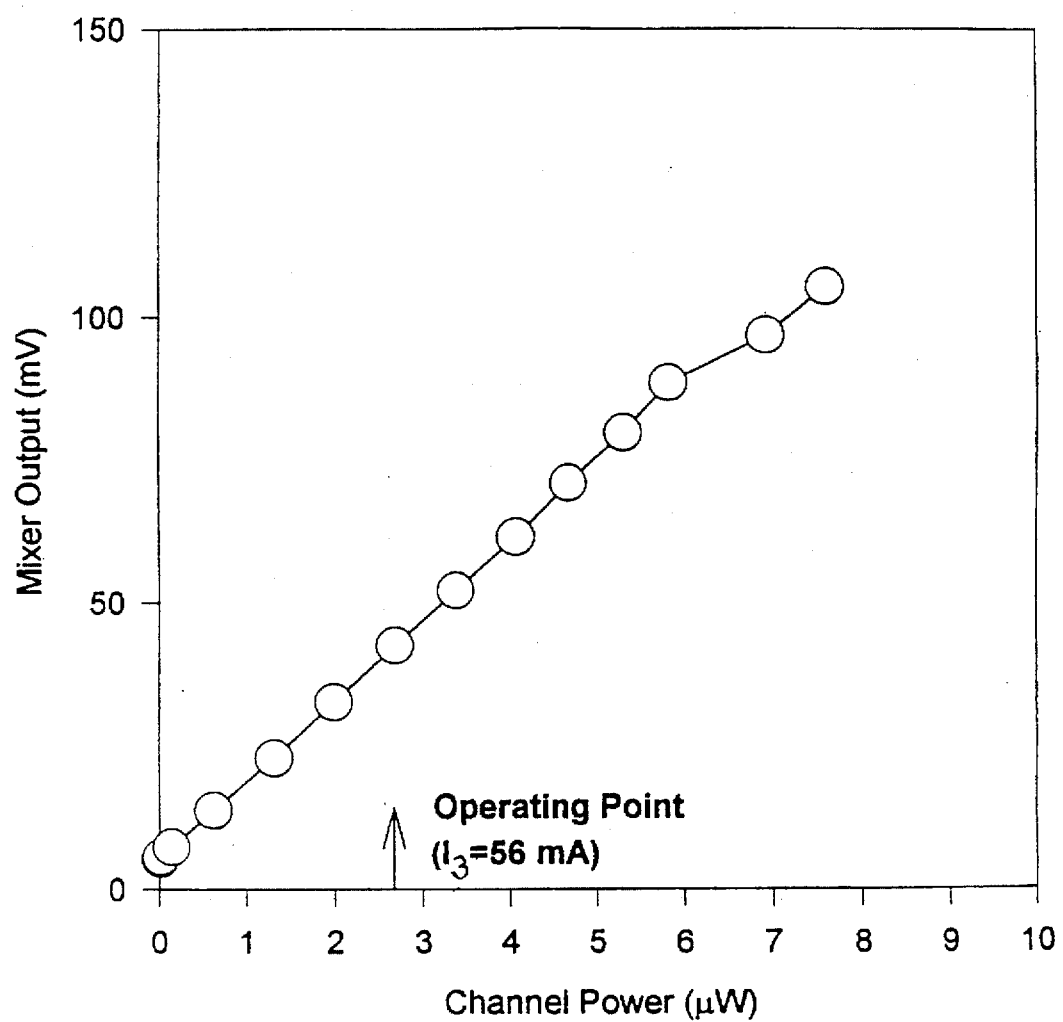
FIG. 5 is a graph representing mixer output voltage as a function of channel 3's power as monitored on an optical spectrum analyzer using the experimental set-up of FIG. 2.

The mixer output for channel 3 was measured with interference from the other 7 channels also modulated with random 50 Mb/s NRZ data. Each channel was programmed with a different random sequence to minimize their cross-correlation. The cross-correlation between the channel 3 signal into the mixer LO input and the remaining channels with single-channel MFL operation (normalized to channel 3's autocorrelation voltage) ranged from $S_{XC} = -0.034$ to $0.056$. Despite cross-correlation effects, a linear autocorrelation response was achieved, as shown in FIG. 5 which represents the mixer output versus channel 3 power. The measurement was obtained by changing the DC bias current to channel 3 after setting the 8 channels to have equal output power at the nominal operating point where the channel 3 bias current ($I_{bias\ 3}$) was 56 mA. The linear response curve confirms that the mixer output voltage is a valid measure of optical signal power in a single modulated channel in the presence of interfering channels.

Stabilization and equalization of eight laser channels was demonstrated with a computer-controlled feedback loop where the mixer LO input signal was sequenced through the eight modulation patterns and the current bias of the corresponding laser channel, i.e. the active channel, was adjusted to reach the set-point mixer voltage. Feedback control was achieved with both NRZ and sequential RZ modulation data formats. The control loop was tested with independent data in the eight channels and with common broadcast data, delayed to decorrelate the channels. For simplicity, the '0' levels of all channels remained below the lasing threshold, thereby avoiding saturation of the mixer voltage. Using a current step resolution of 0.5 mA in the control loop, the mixer voltages of all channels stabilized to within 5% of the set-point value after seven iterations of adjusting the currents to each of the eight channels. The average adjustment period for each channel was 3.7 sec., limited by the speed of the computer control interface. Use of a dedicated controller could reduce this time to an average period of the correlation measurement of approximately 200 msec.

Offset errors in the mixer output voltages due to cross-correlations among the channels were measured by turning off the active channel after the channels were nominally equalized, and the measured offset error was then used to correct the mixer voltages once all channels were turned on again.

Table 1 summarizes the offset voltages with independent NRZ data channels and the steady-state, normalized channel powers measured when cycling the MFL from between 15° C. and 20° C. The set-point mixer voltage is 40 mV. The results of Table 1 show that good uniformity in channel power was obtained—that is, temperature changes of 5° C. produced fluctuations in power of less than 1 dB and the maximum power difference among all eight channels was 1.23 dB. Similar experimental results were obtained using broadcast NRZ data in which the maximum power difference among all eight channels was 0.74 dB.

TABLE 1

Relative Channel-To-Channel Power Variation with Independent NRZ Data

| Wavelength No. | $V_{offset}$ (mV) | P@15° C. (dB)→ | P@20° C. (dB)→ | P@15° C. (dB)→ | →P@20° C. (dB) |
|---|---|---|---|---|---|
| 1 | 16.89 | 0.83 | 0 | 1.06 | 0.14 |
| 2 | 4.98 | 0.71 | 0.83 | 0.77 | 0.49 |
| 3 | 19.24 | 0.76 | 1.06 | 1.03 | 0.47 |
| 4 | 20.07 | 1.21 | 0.43 | 1.13 | 0.66 |
| 5 | 15.53 | 0.71 | 0.23 | 0.50 | 0.57 |
| 6 | 12.44 | 1.21 | 0.72 | 1.05 | 1.15 |
| 7 | 12.58 | 0.20 | 0.49 | 1.28 | 1.25 |
| 8 | 22.07 | 0.63 | 1.23 | 0.79 | 0.81 |

Stabilization of eight channels with sequential RZ modulation was similarly tested and the results summarized in Table 2. The set-point mixer voltage was 20 mV. With the exception of channel 8 at 16° C., good uniformity in channel power was obtained. At 16° C. temperature operation, this particular MFL exhibited spurious lasing in shorter wavelengths that reduced the optical power in wavelength #8, as the stabilized channel power included this spurious lasing. Unequal channel signal powers also resulted from differences in mixer efficiency caused by small variations in the timing between the NRZ signal at the LO input of the mixer and the narrow RZ data pulses going into the RF input of the mixer. This unequal power in channel signals can be corrected using fine timing adjustments as the controller cycles through the channels.

TABLE 2

Relative Channel-To-Channel Power Variation with Sequential RZ Modulated Data

| Wavelength No. | $V_{offset}$ (mV) | P@16° C. (dB) | P@20° C. (dB) |
|---|---|---|---|
| 1 | 4.5 | 1.38 | 1.04 |
| 2 | 4.8 | 1.43 | 2.10 |
| 3 | 5.3 | 1.09 | 1.17 |
| 4 | 4.7 | 0.79 | 1.41 |
| 5 | 5.1 | 0.55 | 1.32 |
| 6 | 5.3 | −0.68 | 0.28 |
| 7 | 5.4 | 1.32 | 1.33 |
| 8 | 5.4 | −2.87 | 0 |

As seen from Tables 1 and 2, the correlation feedback control loop of the present invention compensates for temperature-induced fluctuations or changes in the output power of the MFL. Without the control loop, greater than 10 dB excursions in channel power were observed over small changes in temperature of 5° C. However, in this software-implemented control loop, the maximum allowable temperature slew rate was less than 4° C./min because of the slow cycling of the control sequence. This was tested by first adjusting the laser temperature controller from 15° C. to 20° C. at a slew rate of 25° C./min, and then from 20° C. to 15° C. at a slew rate of −4° C./min, and observing the power excursions in each channel. The observed power fluctuations are summarized below in Table 3. As seen from the results in Table 3, at the lower slew rate of −4° C./min the power variations were limited to within 2.5 dB, whereas variations greater than 7 dB were observed at the higher slew rate of 25° C./min.

TABLE 3

Temperature Induced Channel Power Fluctuations

| Wavelength No. | Power Variation @−4° C./min (dB) | Power Variation @25° C./min (dB) |
|---|---|---|
| 1 | 1.68 | 4.39 |
| 2 | 1.45 | 3.23 |
| 3 | 0.94 | 4.90 |
| 4 | 1.72 | 4.14 |
| 5 | 2.34 | 7.06 |
| 6 | 2.46 | 4.19 |
| 7 | 2.24 | 4.22 |
| 8 | 1.97 | 5.48 |

Output eye patterns and bit-error-rate performance were tested with the NRZ and sequential RZ modulation of the 8 channels during stabilization by correlation feedback. Once again referring to the experimental set-up of FIG. 2, the output eye patterns and bit-error-rate performance results were generated by sending the signal at the 20% port of the fiber-splitter 40' through an erbidium-doped fiber amplifier (EDFA) 90'. The output from EDFA 90' was filtered by an array waveguide grating router (AWGR) 100', thereby generating a single channel eye pattern. The single channel eye pattern was transmitted to an optical spectrum analyzer (OSA)/bit-error-rate receiver (BER Rx) 1101 to measure the modulated output power and bit-error-rate performance.

Figure 6A:
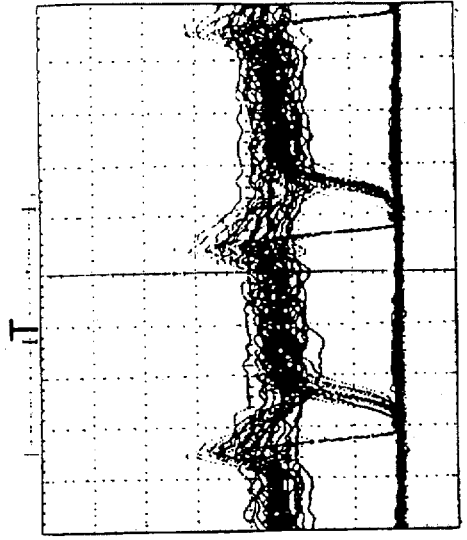
FIG. 6a depicts a total output signal of the multi-frequency laser in the experimental set-up of FIG. 2 with non-return-to-zero modulation of all 8-channels simultaneously.
Figure 6B:
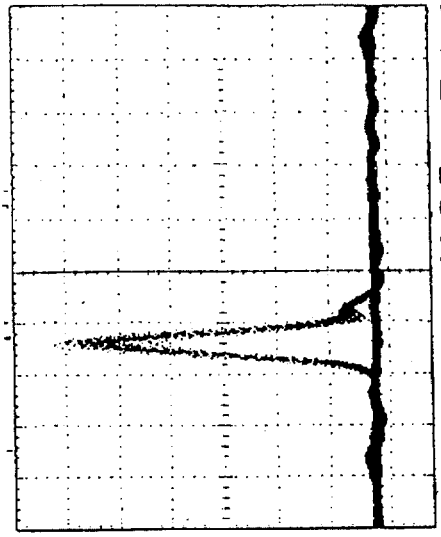
FIG. 6b depicts a non-return-to-zero eye pattern of one channel of the multi-frequency laser in the experimental set-up of FIG. 2 filtered by an 8-channel arrayed waveguide grating router.
Figure 6C:
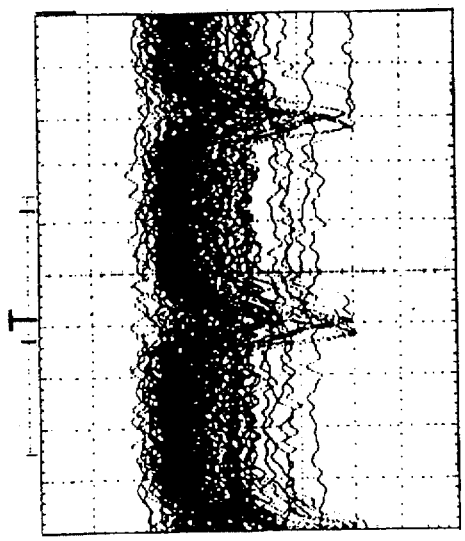
FIG. 6c depicts a total output signal of the multi-frequency laser in the experimental set-up of FIG. 2 using sequential return-to-zero modulation.
Figure 6D:
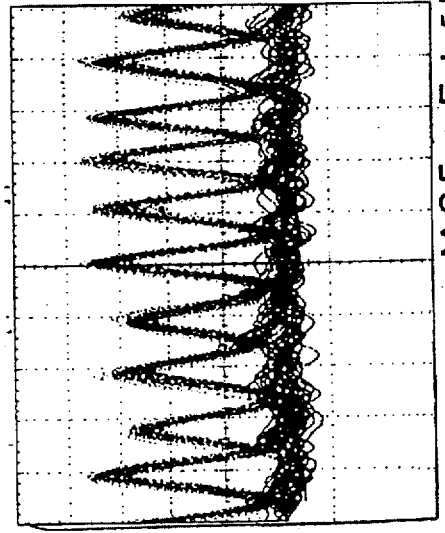
FIG. 6d depicts a sequentially return-to-zero modulated eye pattern of one channel of the multi-frequency laser in the experimental set-up of FIG. 2 filtered by the 8-channel arrayed waveguide grating router.

Error-free performance was achieved with both modulation formats. FIGS. 6a through 6d show the MFL output and eye patterns detected with a 400 MHz bandwidth receiver. FIG. 6a shows the total output signal from the MFL during NRZ modulation, and FIG. 6b shows a representative eye pattern of one channel filtered by the AWGR. Significant turn-on delay due to below-threshold operation and distortion due to crosstalk in the common amplifier were evident, as seen in FIG. 6b. The MFL output signal with sequential RZ modulation is shown in FIG. 6c and a representative signal-channel eye pattern filtered by the AWGR is shown in FIG. 6d. In contrast to that shown in FIG. 6b, no significant interchannel crosstalk was observed using sequential RZ modulation while the power differences in FIG. 6c were caused by timing errors encountered during NRZ modulation.

It should be noted that the herein disclosed and described experimental set-up and results are solely for purposes of illustration and are not intended to limit the scope of the invention in any way.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A correlation feedback multi-channel stabilization system comprising:

a data source for generating N data channels;

a laser driver for receiving said N data channels from said data source and for generating a driving signal for each of said N data channels;

a multi-channel transmitter for receiving said driving signals for each of said N data channels from said laser driver and for generating a total power output signal;

means for tapping a sample of light, said tapping means receiving said total power output signal from said multi-channel transmitter and splitting said total power output signal into two tap signals;

means for converting an optical signal to an electrical signal, said conversion means receiving one of the tap signals from said tapping means and generating an output electrical signal;

means for correlating said output electrical signal and at least one reference data signal from a set of reference data signals associated with each of said N data channels and for generating at least one correlation voltage; and a controller for receiving said at least one correlation voltage from said correlating means and for adjusting at least one of a '0' current level, a '1' current level, a current bias and a modulation current of at least one of said N data channels as a function of said at least one correlation voltage, wherein said controller generates at least one correction signal used to control said at least one of a '0' current level, '1' current level, current bias and modulation current of said associated N data channels via a feedback loop connected to said laser driver.

2. The system in claim 1, wherein said controller is further operative for correcting for offset errors in at least one of said N data channels.

3. The system in claim 1, wherein said tapping means comprises a fiber-splitter.

4. The system in claim 1, wherein said correlator comprises one of an RF mixer and a high-speed analog multiplier.

5. The system in claim 4, further comprising a selector for receiving said N data channels from said data source and for selecting a single reference data signal from said set of reference data signals for correlation with said total power output signal, wherein said selector operatively sequences through said set of reference data signals one at a time in response to a control signal from said controller.

6. The system in claim 5, wherein said selector comprises one of a multiplexer and an electronic switching device.

7. The system in claim 1, wherein said correlator comprises one of a plurality of RF mixers and a plurality of high-speed analog multipliers, one for each of said N data channels, for generating N correlation voltages, and wherein said controller receives said N correlation voltages and generates N correction signals.

8. The system in claim 1, wherein said correlator comprises a digital signal processing chip for receiving each of said N data channels from said data source and for generating N correlation voltages, and wherein said controller receives said N correlation voltages and generates N correction signals.

9. The system in claim 1, wherein each channel of said multi-channel transmitter comprises random independent data.

10. The system in claim 1, wherein each channel of said multi-channel transmitter comprises decorrelated broadcast data.

11. The system in claim 1, wherein said set of reference data signals comprise unique identification codes associated with each of the N channels.

12. The system in claim 8, wherein the unique identification codes of the N channels are represented by a bipolar array wherein a number of rows of the bipolar array equals a number of channels N.

13. The system in claim 1, wherein said multi-channel transmitter comprises an integrated distributive feedback laser array.

14. The system in claim 1, wherein said multi-channel transmitter comprises a multi-frequency laser.

15. The system in claim 1, wherein said conversion means comprises an optical receiver.

16. The system in claim 1, wherein said conversion means comprises a photodetector.

17. The system in claim 1, wherein said controller comprises a dedicated controller.

18. A method for multi-channel stabilization of a multi-channel transmitter through correlation feedback, said method comprising the steps of:

(a) generating N data channel signals from a data source;

(b) generating N driving signals based on said N data channel signals;

(c) generating a total power output signal based on said N driving signals;

(d) splitting said total power output signal into two tap signals;

(e) converting one of said two tap signals from an optical signal to an electrical signal;

(f) correlating said electrical signal and at least one reference data signal from a set of reference data signals associated with each of said N channel data signals and generating at least one correlation voltage; and (g) controlling an output power of the active channel by adjusting at least one of a '0' current, a '1' current, a bias current and a modulation current of at least one of said N channel data signals associated with said at least one reference data signal based on said at least one correlation voltage.

19. The method in claim 18, wherein said step (g) further comprises the step of:

(h) comparing said at least one correlation voltage with a predetermined set-point correlation voltage, wherein if said at least one correlation voltage does not equal or does not surpass the set-point correlation voltage then at least one of said '0' current, '1' current, bias current and modulation current is adjusted and said steps (b) and (g) are repeated until said at least one correlation voltage surpasses or is equal to the set-point correlation voltage such that said at least one data channel associated with said at least one reference data signal is nominally equalized.

20. The method in claim 19, wherein step (g) further comprises the step of:

(i) sequencing in an iterative manner through said set of reference data signals to a next reference data signal such that an associated next channel becomes active and repeating steps (b) through (i) for said associated next channel.

21. The method in claim 19, further comprising the step of correcting for offset errors after said N data channels have been nominally equalized, said correcting step further comprising the steps of:

(j) disabling one of said N data channel signals;

(k) determining the correlation voltage for the disabled channel signal by repeating said steps (c) through (f); and (l) adjusting for offset error in the disabled channel signal based on said correlation voltage, and repeating said steps (j) through (l) for each of said N data channel signals.

* * * * *